US012683473B2

(12) United States Patent
Bickel et al.

(10) Patent No.: US 12,683,473 B2
(45) Date of Patent: Jul. 14, 2026

(54) METHOD FOR PRODUCING A SINGLE- OR MULTI-LAYER COIL, LAYER COIL, ELECTRIC MACHINE, AND DEVICE

(71) Applicant: Bayerische Motoren Werke Aktiengesellschaft, Munich (DE)

(72) Inventors: Benjamin Bickel, Nuremberg (DE); Noah Streidel, Erlangen (DE); Juntao Zhu, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 186 days.

(21) Appl. No.: 18/686,526

(22) PCT Filed: Sep. 5, 2022

(86) PCT No.: PCT/EP2022/074570
§ 371 (c)(1),
(2) Date: Feb. 26, 2024

(87) PCT Pub. No.: WO2023/052038
PCT Pub. Date: Apr. 6, 2023

(65) Prior Publication Data
US 2024/0291362 A1      Aug. 29, 2024

(30) Foreign Application Priority Data
Oct. 1, 2021   (DE) ..................... 10 2021 125 495.7

(51) Int. Cl.
*H02K 15/043* (2025.01)
*H02K 3/12* (2006.01)

(52) U.S. Cl.
CPC ........... *H02K 15/0431* (2025.01); *H02K 3/12* (2013.01)

(58) Field of Classification Search
CPC ........... H02K 3/12–14; H02K 15/0421; H02K 15/043–0431; H02K 15/064; H02K 15/0643

(Continued)

(56) References Cited

U.S. PATENT DOCUMENTS

2012/0086298 A1* 4/2012 Fubuki ..................... H02K 3/18
                                                          336/222
2016/0352169 A1  12/2016 Egashira et al.

(Continued)

FOREIGN PATENT DOCUMENTS

DE      11 2015 000 717 T5      11/2016
DE      10 2017 124 859 A1      4/2019

(Continued)

OTHER PUBLICATIONS

International Search Report (PCT/ISA/210) issued in PCT Application No. PCT/EP2022/074570 dated Nov. 30, 2022 with English translation (6 pages).

(Continued)

*Primary Examiner* — Oluseye Iwarere
*Assistant Examiner* — Minki Chang
(74) *Attorney, Agent, or Firm* — Crowell & Moring LLP

(57) ABSTRACT

A method for producing a single- or multi-layer coil, includes the steps of: providing a flat wire; deforming the flat wire along a deforming direction in order to produce one or more winding sections which are designed to be offset relative to a starting section of the flat wire, wherein the one or more winding sections are designed to form coil layers which run on winding planes arranged in an offset manner relative to the deforming direction; and winding the one or more winding sections on the respective winding plane in order to form one or more coil layers.

12 Claims, 1 Drawing Sheet

(58) Field of Classification Search
USPC .................................................. 310/179–215
See application file for complete search history.

(56) References Cited

U.S. PATENT DOCUMENTS

| | | | | |
|---|---|---|---|---|
| 2017/0117767 A1* | 4/2017 | Ishigami | .................. | H02K 3/12 |
| 2021/0178452 A1 | 6/2021 | Hortrich et al. | | |

FOREIGN PATENT DOCUMENTS

| | | |
|---|---|---|
| DE | 10 2019 134 785 A1 | 6/2021 |
| JP | 2000-217315 A | 8/2000 |
| JP | 2000-245092 A | 9/2000 |
| JP | 2003-9480 A | 1/2003 |

OTHER PUBLICATIONS

German-language Written Opinion (PCT/ISA/237) issued in PCT Application No. PCT/EP2022/074570 dated Nov. 30, 2022 with English translation (9 pages).
German-language Search Report issued in German Application No. 10 2021 125 495.7 dated Jan. 13, 2022 with partial English translation (15 pages).

* cited by examiner

METHOD FOR PRODUCING A SINGLE- OR MULTI-LAYER COIL, LAYER COIL, ELECTRIC MACHINE, AND DEVICE

BACKGROUND AND SUMMARY

The present invention relates to a method for producing a single- or multi-layer coil, a layer coil, an electric machine and a device.

Layer coils of the type in question are typically formed from flat wires. They have, relatively speaking, a relatively large cross section, generally a rectangular cross section, and can only be formed with difficulty. In particular, automated production proves to be difficult. On account of the good electrical properties of preformed windings, they are however increasingly also of interest for electrical drives, such as are used in partly or fully electrically operated motor vehicles.

It is therefore an object of the present invention to provide a method for producing a single- or multi-layer coil, a layer coil, an electric machine and a device that allow layer coils of the highest quality to be produced quickly and in a reliable process.

This object is achieved by a method, by a layer coil, by an electric machine, and by a device, in accordance with the independent claims. Further advantages and features emerge from the dependent claims and also the description and the appended figures.

According to the invention, a method for producing a single- or multi-layer coil comprises the steps of:

> providing a flat wire;
> deforming the flat wire along a deforming direction to create one or more winding sections designed as offset in relation to a starting section of the flat wire, the winding section or sections being designed or intended for forming coil layers which run in winding planes arranged offset in relation to the deforming direction;
> winding the winding section or sections within the respective winding plane to form one or more coil layers.

According to one embodiment, the flat wire is an, in particular metal, flat wire with a preferably angular, such as for example square or in particular rectangular, cross section. The expression "flat wire" is explicitly not to be understood in the sense that it must necessarily have a rectangular or "flat" cross section. The flat wire preferably has an insulating layer. Typically, the material of the flat wire is copper. The insulating layer serves in particular for the electrical insulation of the conductor element/flat wire. Expediently, the method comprises two separate or distinct deforming steps, to be specific the deforming of the flat wire along the deforming direction to create the winding sections, and the actual winding or forming of the coil layers within the winding planes. This division advantageously allows shaping that is very precise and in particular can be automated well.

According to one embodiment, the method comprises the step of:

> arranging the flat wire in a deforming tool to create an, in particular S-shaped, deforming region.

The aforementioned deforming region is expediently used to achieve the offset. The deforming preferably takes place for example with a two-part deforming tool. This can expediently be used to achieve high deforming forces, which are necessary for the forming of the flat wire. As mentioned, the flat wire has for example a rectangular cross section. The deforming direction is preferably perpendicular to the short side of the cross section, that is to say in particular the rectangular cross section. The winding within the winding plane correspondingly takes place over the long side. Significantly less expenditure of force is required here. It is correspondingly advantageous to separate these two processes from each other. The S-shaped design or the design of the deforming region as a twisted S shape can be achieved well by using a deforming process.

According to one embodiment, the method comprises the step of:

> creating the winding sections before the winding of the coil layers or the coil layer.

Creating the winding sections comprises in particular introducing the deforming regions. According to one embodiment, before the winding of the coil layers, a multiplicity of winding sections are formed. According to one embodiment, all of the required winding sections are preformed. In the case of a three-layer coil, for example three deforming regions are created. This may be advantageous since after that only the winding of the coil layers within the winding planes has to be carried out. Alternatively, it is also possible to create the winding sections one after the other and respectively fabricate the corresponding coil layer first, before the respectively following deforming section is introduced. It should be mentioned at this point that the geometrical design of the deforming section does not have to be made the same. In particular, the first deforming region, which connects the starting section to the first winding plane, is expediently formed differently than a deforming region which connects two coil layers.

According to one embodiment, the method comprises the step of:

> forming an end section of the coil layer in the last or the single winding plane.

Expediently, the end section of the layer coil lies in the respectively last or single winding plane.

The coil end, as well as the starting section or the coil beginning, project beyond the respective coil layer(s) by an overhang. In the region of the overhang, the layer coils are interconnected or contacted with one another in further method steps for forming a preformed winding.

According to a preferred embodiment, successive coil layers are wound one after the other. The method therefore advantageously allows the production of single- and multi-layer coils without changing the sequence of the method, since the individual coil layers can be respectively fabricated sequentially.

According to a preferred embodiment, the method comprises the step of:

> winding the at least one coil layer from inside to outside.

Expediently, all of the coil layers are also wound in the same sense. This is also beneficial with respect to automatability.

Expediently, a tool or a device which is used in particular for winding the coil layers is used for production.

According to one embodiment, the method comprises the step of:

> arresting at least the starting section or the coil beginning in an interlocking and/or frictionally engaging manner during the winding.

Expediently, the starting section or the coil beginning is fixed or clamped in a suitable way while the at least one coil layer is being wound. The winding expediently takes place by means of the aforementioned device, which has two guiding sections, by way of which the basic form of the coil layer is predetermined. The guiding sections expediently comprises guiding elements, by way of which for example the already introduced deforming regions can also be mounted and positioned or guided.

According to one embodiment, the method comprises the step of:

> introducing an angle which is adapted to a slot angle, in particular for example of a stator, between the winding planes.

To form a preformed winding, the layer coils are for example introduced into the slots of a stator body or arranged there. The slots formed on an inner circumferential surface of the stator body have an angle in relation to one another, to be specific the aforementioned slot angle. This slot angle is advantageously already taken into account or allowed for during the forming of a multi-layer coil. According to one embodiment, the angle may already be introduced during the forming of the winding sections. As an alternative or in addition, the angle may be introduced during the winding of the coil layers. As a further alternative or in addition, the angle may also be introduced subsequently, after the forming of the coil layers.

The invention also relates to a layer coil, in particular produced by the method according to the invention, formed from a flat wire and comprising at least one coil layer, the at least one coil layer lying in a winding plane which is offset or kept at a distance in relation to a coil beginning of the layer coil by an offset, and the offset being created by deforming the flat wire along a deforming direction which is oriented perpendicularly or substantially perpendicularly to the winding plane. It should be mentioned at this point that the advantages mentioned in connection with the method apply analogously and correspondingly to the layer coil, as well as to the later-mentioned electric machine and the device, and also vice versa and with respect to one another.

According to one embodiment, the layer coil comprises a multiplicity of coil layers, the coil layers being respectively kept at a distance from one another by an offset, and the offset being created by deforming the flat wire along a deforming direction which is oriented perpendicularly or substantially perpendicularly to the winding planes of the coil layers. Expediently, the offset is respectively created separately from the coil layers. The offset is therefore not introduced during the winding of the coil layers themselves, but already before. Expediently, a deforming tool, for example a corresponding die, is used for this. The offset is achieved by using correspondingly designed deforming regions in the flat wire, the forming region being preferably designed in an S-shaped form. Such an S-shaped deforming region may also be referred to as a twisted S shape. As already mentioned in connection with the method, such twisted S shapes are expediently created or produced separately from the coil layers themselves. This does not mean however that the deforming region does not undergo any subsequent deformation during the winding. If necessary, a deforming region may still undergo a deformation, even if relatively minor, during the winding of the coil layers.

The respective end section of the flat wire or the layer coil expediently lies in the last or the respectively single winding plane. The coil layers are expediently wound from inside to outside and respectively in the same sense, which is beneficial to the automatability of the production process.

According to one embodiment, the layer coil has a number of coil layers which are oriented at an angle in relation to one another which is adapted to a slot angle. This facilitates the arrangement of multiple layer coils in the slots for example of a stator body. It is thereby also ensured in particular that for example the insulation of the layer coil is not damaged when it is being arranged in the slots.

The invention is also directed to an electric machine, comprising at least one layer coil according to the invention. Expediently, the electric machine comprises a stator or rotor which has a preformed winding which is formed from the layer coils according to the invention. According to a preferred embodiment, the stator of the electric machine has a preformed winding which is built up from the layer coils according to the invention or which consists of layer coils which have been produced by the method according to the invention. Preferably, the electric machine is a traction motor of a partially or fully electrically operated motor vehicle, such as a motorcycle, a passenger car or a commercial vehicle.

The invention also relates to a device, in particular for carrying out the method according to the invention, comprising two guiding sections by way of which a flat wire can be wound to form one or more coil layers, the guiding sections having guiding elements which are designed for guiding the flat wire.

Expediently, the device comprises means for arresting the flat wire or the already formed layer coil in an interlocking and/or frictionally engaging manner. Expediently, the means are designed for arresting, in particular holding, the flat wire in an interlocking and/or frictionally engaging manner, at least in some regions or some sections. Good automatability of the method can be advantageously achieved thereby. Such means may be formed for example as clamping elements which are designed to hold the flat wire in some sections, in particular for example at the coil beginning or at the starting section of the flat wire.

According to one embodiment, the aforementioned guiding elements are formed and designed to guide or hold the preformed deforming regions. In addition, guiding elements may be formed to guide the coil layers or to predetermine the form of the winding planes or to maintain it during the winding of the coil layers.

Further advantages and features emerge from the following description of the method and of a layer coil and a device with reference to the appended figures.

DETAILED DESCRIPTION OF THE DRAWINGS

Figure 1:
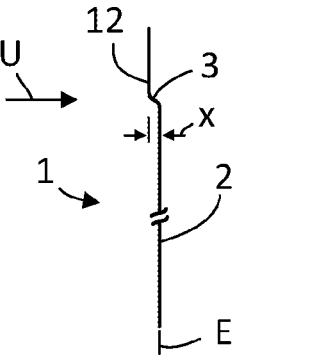
FIG. 1 is a schematic view of a flat wire and of a forming tool.
Figure 1:
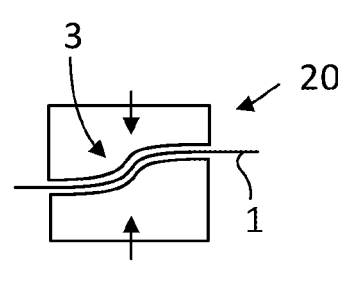

FIG. 1 schematically shows a flat wire 1, it having a starting section 12, which is offset with respect to a winding section 2 by an offset x. The aforementioned offset x is achieved by way of a deforming region 3, which may also be referred to as a twisted S shape. The deforming region 3 is introduced by deforming the flat wire 1 along a deforming direction U, as indicated by the arrow. The winding section 2 subsequently lies in a plane E, which is offset with respect to the starting section 12 by the offset x. Schematically indicated in the right-hand half of FIG. 1 is a forming tool 20, which has an upper die and a lower die and which is intended to deform a flat wire 1 arranged in between in such a way that a deforming region 3 is created. Depending on whether a single- or multi-layer coil is to be created, a
number of such deforming regions 3 may be created.

Figure 2:
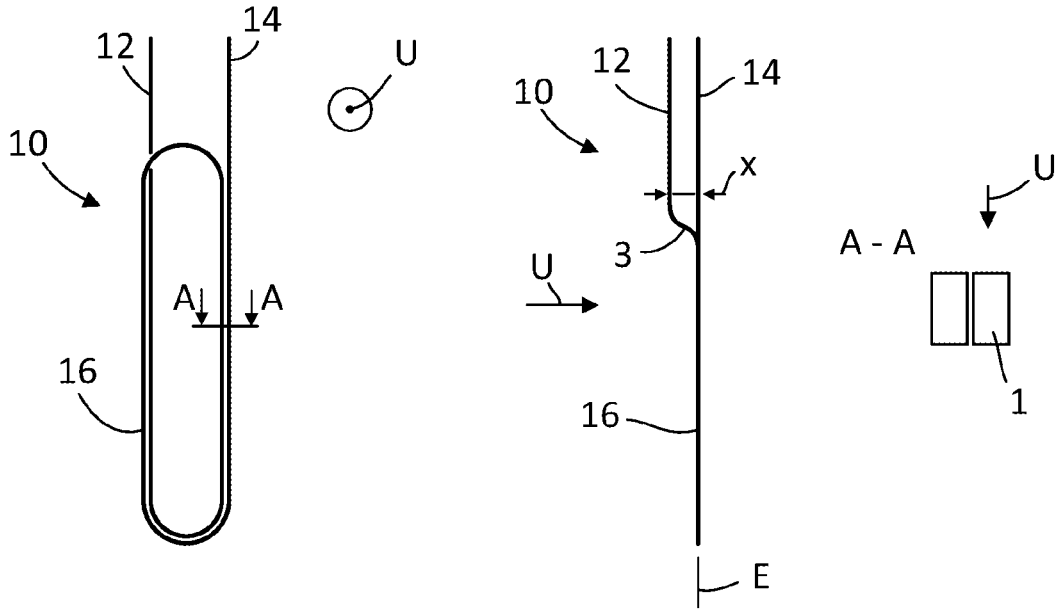
FIG. 2 shows a number of views of a schematically represented layer coil.

FIG. 2 shows in a number of schematic views an embodi-
ment of a single-layer coil. In the middle view it can be seen
how a layer coil 10, which has a coil layer 16 in a winding
plane E, is formed from a flat wire 1, such as that indicated
in FIG. 1. The layer coil 10 comprises a starting section or
coil beginning 12 and also an end section or a coil end 14,
which respectively project beyond the coil layer 16, cf. in
this respect also the view represented on the left. The coil
layer 16 and the coil end 14 are offset or kept at a distance
in relation to the coil beginning 12 by an offset x, this being
created by way of a deforming region 3. In the view on the
left, the form or shape of the coil layer 16 can be seen. In
particular, it can be seen that the coil layer 16 is wound from
the inside to the outside. Shown on the right is the section
A-A, as it is indicated on the left. The windings of the flat
wire 1 can be seen in the section, with the rectangular cross
section evident in particular. The deforming direction U is
perpendicular or substantially perpendicular to the short side
of the flat wire 1. Correspondingly, considerable force is
required during the deforming along the deforming direction
U. A forming tool 20, such as that indicated in FIG. 1, is
correspondingly advantageously used for this. The winding
itself for forming the at least one coil layer 16 takes place
around the long side, with less expenditure of force being
required to do so.

Figure 3:
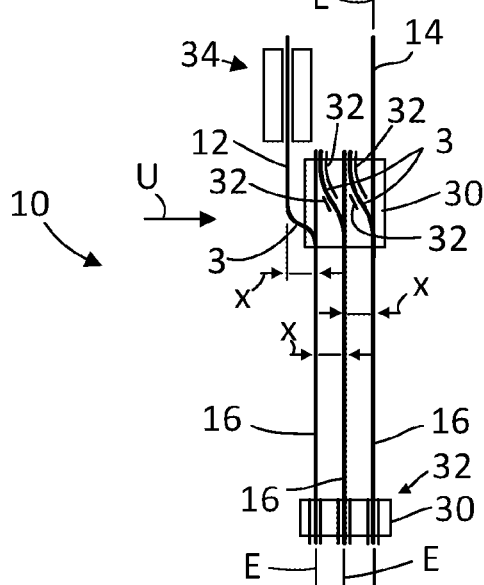
FIG. 3 shows a schematically represented multi-layer coil in a side view.

FIG. 3 shows a multi-layer coil 10, the basic construction
being the same as in the case of the single-layer coil, cf. FIG.
2. However, in the present case a number of winding planes
E are formed, in which coil layers 16 are respectively
formed. Correspondingly, a number of deforming regions 3
are likewise formed. The reference signs 30 denote guiding
sections of a device or a tool which is used for forming the
layer coil. The guiding sections 30 comprise guiding ele-
ments 32, which are intended to guide, arrest or position,
etc., regions or sections of the layer coil 20. In particular,
guiding elements 32 by way of which the deforming regions
are guided and positioned are provided for example. Expe-
diently, all of the deforming regions 3 are created by tools
such as those indicated in FIG. 1. However, not all of the
deforming regions must in this case have exactly the same
form. In particular, the deforming region between the start-
ing section 12 and the first winding plane E expediently has
a different form than the deforming regions 3 between the
winding planes E. Reference sign 34 indicates two clamping
elements which are designed to arrest the starting section or
coil beginning 12 of the layer coil 10 during the winding.
Alternatively, a number of such clamping elements 34 may
also be provided or arranged to hold the layer coil 10 in some
sections during the winding.

Figure 4:
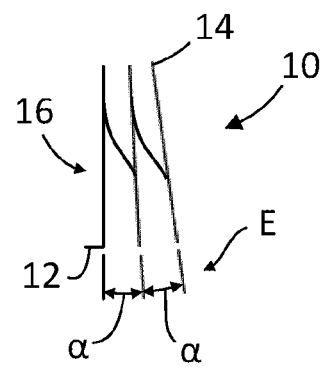
FIG. 4 shows a view (seen along a longitudinal axis) of a multi-layer coil in a schematic representation.

FIG. 4 shows a view seen along a longitudinal axis of the
multi-layer coil 10, comprising in the present case three coil
layers 16. It is indicated that the winding planes E, in which
the coil layers 16 run, are not oriented parallel to one another
but are at an angle α in relation to one another which is
expediently adapted to a slot angle, for example of a stator,
at which the layer coil 10 is intended to be arranged.

LIST OF REFERENCE SIGNS

1 Flat wire
2 Winding section
3 Deforming region, twisted S shape
10 Layer coil
12 Starting section, coil beginning
14 End section, coil end 16 Coil layer
20 Forming tool
30 Guiding sections
32 Guiding element
34 Clamping elements
x Offset
α Angle
W Winding plane

What is claimed is:

1. A method for producing a single or multiple layer coil,
the method comprising the steps of:
   providing a flat wire;
   deforming the flat wire along a deforming direction in
      order to produce one or more winding sections config-
      ured to be offset in relation to a starting section of the
      flat wire, wherein the winding section or sections are
      designed to form coil layers which run in winding
      planes arranged in an offset manner relative to the
      deforming direction;
   arranging the flat wire in a deforming tool in order to
      produce S-shaped deforming regions; and
   winding the winding section or sections within the respec-
      tive winding plane to form one or more coil layers;
   wherein a first S-shaped deforming region of the S-shaped
      deforming regions between the starting section and a
      first winding plane of the winding planes has a different
      form than second S-shaped deforming regions of the
      S-shaped deforming regions between the winding
      planes.

2. The method according to claim 1, wherein
   the flat wire has a rectangular cross section, and
   the deforming direction is perpendicular to a short side of
      the rectangular cross section.

3. The method according to claim 1, further comprising
the step of:
   producing the winding sections before the winding of the
      one or more coil layers.

4. The method according to claim 1, further comprising
the step of:
   forming an end section of the coil layer in a last of, or a
      single one of, the winding plane.

5. The method according to claim 1, wherein successive
coil layers are wound one after the other.

6. The method according to claim 1, further comprising
the step of:
   winding the one or more one coil layers from inside to
      outside.

7. The method according to claim 1, further comprising
the step of:
   arresting at least the starting section in an interlocking
      and/or frictionally engaging manner during the wind-
      ing.

8. The method according to claim 1, further comprising
the step of:
   introducing an angle, which is adapted to a slot angle, of
      a stator, between the winding planes.

9. A layer coil, comprising:
   a plurality of coil layers formed from a flat wire,
   wherein the plurality of coil layers include a plurality of
      winding sections, which are offset in relation to a coil
      beginning of the layer coil, and a plurality of S-shaped
      deforming regions,
   wherein the winding sections form coil layers which run
      in winding planes arranged in an offset manner relative
      to a deforming direction of the flat wire which is
      oriented perpendicularly or substantially perpendicu-
      larly to the winding plane, and wherein a first S-shaped deforming region of the S-shaped deforming regions between the coil beginning and a first winding plane of the winding planes has a different form than second S-shaped deforming regions of the S-shaped deforming regions between the winding planes.

10. The layer coil according to claim 9, wherein the coil layers are respectively kept at a distance from one another by the offset, and wherein each offset is produced by deforming the flat wire along the deforming direction which is oriented perpendicularly or substantially perpendicularly to the winding planes of the coil layers.

11. The layer coil according to claim 10, wherein a number of the coil layers are oriented at an angle in relation to one another, which angle is adapted to a slot angle.

12. An electric machine comprising at least one of the layer coil according to claim 9.

* * * * *